United States Patent [19]

Frey et al.

[11] 3,994,899
[45] Nov. 30, 1976

[54] METAL COMPLEX PIGMENTS

[75] Inventors: Christoph Frey, Aesch; Jost von der Crone, Riehen, both of Switzerland

[73] Assignee: Ciba-Geigy Corporation, Ardsley, N.Y.

[22] Filed: May 13, 1975

[21] Appl. No.: 577,144

[30] Foreign Application Priority Data

May 29, 1974 Switzerland.................... 7373/74

[52] U.S. Cl................................ 260/270 T; 8/1 D; 8/4; 8/3; 8/177 R; 8/177 C; 8/178 R; 8/178 E; 8/179; 8/180; 8/63; 106/292; 106/288 Q; 260/282; 260/287 CF

[51] Int. Cl.$^2$....................................... C07D 401/06

[58] Field of Search ............................... 260/270 T

[56] References Cited
UNITED STATES PATENTS 3,919,235  11/1975  Crounse et al. ............. 260/270 PD

*Primary Examiner*—Acton D. Rollins
*Assistant Examiner*—Mark L. Berch
*Attorney, Agent, or Firm*—Vincent J. Cavalieri

[57] ABSTRACT

Metal complex pigments of the formula

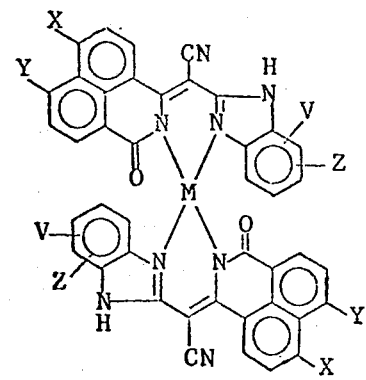

wherein X and Y denote hydrogen or halogen atoms or alkyl or alkoxy groups containing 1–4 C atoms and V and Z denote hydrogen or halogen atoms, nitro groups or alkyl, alkoxy or alkylsulphonyl groups containing 1–6 atoms, the two radicals V and Z can furthermore form a fused benzene ring and M represents a polyvalent metal atom, except an alkaline earth metal atom which are useful for pigmenting high molecular organic material.

3 Claims, No Drawings

METAL COMPLEX PIGMENTS

The present invention relates to new metal complex pigments of the formula

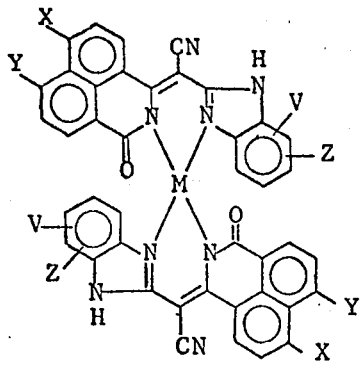

(I)

wherein X and Y denote hydrogen or halogen atoms or alkyl or alkoxy groups containing 1–4 C atoms and V and Z denote hydrogen or halogen atoms, nitro groups or alkyl, alkoxy or alkylsulphonyl groups containing 1–6 atoms, the two radicals V and Z can furthermore form a fused benzene ring, and M represents a polyvalent metal atom, except an alkaline earth metal atom.

Particular interest attaches to those pigments of the formula indicated, wherein M denotes a nickel, cobalt or copper atom and the substituents V, X, Y and Z denote hydrogen atoms.

The new colorants are obtained when a methine colorant of the formula

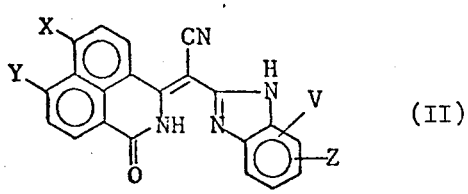

(II)

wherein V, X, Y and Z have the indicated meaning, is treated with agents which donate polyvalent metal ions, except alkaline earth metal ions.

Preferred starting materials are those azomethine colorants of the formula (II) wherein the substituents V, X, Y and Z denote hydrogen atoms.

The methine colorants of the formula II are new compounds which are obtained by condensation of a cyanomethylbenzimidazole of the formula

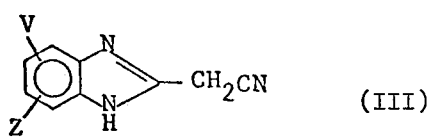

(III)

with a 1,3-dihydro-2H-benzisoquinolone-3 of the formula

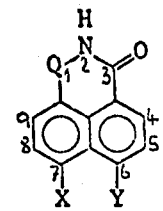

(IV)

wherein, in the formulae indicated, V, X, Y and Z have the meaning indicated and Q denotes a group of the formula

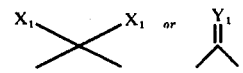

wherein $X_1$ denotes a halogen atom or an alkoxy group containing 1–4 C atoms, and $Y_1$ denotes an imino group.

The following may be mentioned as examples of cyanomethylbenzimidazoles: 2-cyanomethyl-benzimidazole, 2-cyanomethyl-4-chloro-benzimidazole, 2-cyanomethyl-5-chloro-benzimidazole, 2-cyanomethyl-5,6-dichloro-benzimidazole, 2-cyanomethyl-4-chloro-6methyl-benzimidazole, 2-cyanomethyl-5-methoxy-benzimidazole, 2-cyanomethyl-6-ethoxy-benzimidazole, 2-cyanomethyl-6-nitro-benzimidazole, 2-cyanomethyl-6-cyanobenzimidazole, 2-cyanomethyl-5-methylsulphonyl-benzimidazole, 2-cyanomethyl-5,6-dimethyl-benzimidazole and 2-cyanomethyl-4,6-dimethyl-benzimidazole.

Those compounds of the formula IV wherein Q denotes a group of the formula

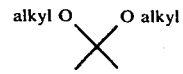

are obtained by reaction of the corresponding 8-cyanonaphthoic acid alkyl esters, especially 8-cyanonaphthoic acid methyl ester, with an alkali metal alcoholate, especially sodium methylate, in an aliphatic alcohol, especially methanol. It is also possible to dispense with isolation of the 1,1-dialkoxy-1,3-dihydro-2H-benzisoquinolones-3 and to add a solution of sodium methylate in methanol to the 8-naphthoic acid alkyl ester and then add the cyanomethyl-imidazole, for the condensation reaction, in the same vessel.

To manufacture the compounds of the formula IV it is possible to start, for example, from the following 8-cyanonaphthoic acid esters: 8-cyanonaphthoic acid methyl ester, 8-cyanonaphthoic acid ethyl ester, 8-cyanonaphthoic acid isopropyl ester, 4- or 5-chloro-8-cyanonaphthoic acid methyl ester, 4- or 5-bromo-8-cyanonaphthoic acid methyl ester, 4,5-dichloro-8-cyanonaphthoic acid methyl ester, 4- or 5-methyl-8-cyanonaphthoic acid methyl ester and 4- or 5-methoxy-8-cyanonaphthoic acid methyl ester.

The condensation of the cyanomethylbenzimidazole with the compound of the formula (IV) is suitably carried out in an organic solvent, for example an alcohol, such as methanol, ethanol, isopropanol or ethylene glycol monoethyl ether, glacial acetic acid or dimethylformamide, at elevated temperatures.

Since the condensation products obtained are sparingly soluble in the solvents mentioned, they can easily be isolated by filtration. Any impurities can be removed by elution. They can be used as colorants, for example for the bulk coloration of linear polyesters.

To convert them into the metal complexes, the methine colorants obtained are treated with agents which donate polyvalent metal ions, preferably those of the transition metals or of zinc or cadmium, but especially of nickel, copper and cobalt. Preferably, the formates, acetates or stearates of these metals are used, for example nickel-(II) acetate, copper-(II) acetate, cobalt-(II) acetate or cobalt-(III) acetylacetonate. The metallisation is suitable carried out in one of the abovementioned solvents, or in mixtures of the abovementioned solvents, especially in dimethylformamide or diethylene glycol monoethyl ether.

It is also possible to carry out the condensation and metallisation in a one-pot process.

The new colorants are valuable pigments which can be used, in a finely divided form, for pigmenting high molecular organic material, for example cellulose ethers and esters, such as ethylcellulose, nitrocellulose, cellulose acetate, cellulose butyrate, natural resins or synthetic resins, such as polymerisation resins or condensation resins, for example aminoplasts, especially urea-formaldehyde and melamine-formaldehyde resins, alkyd resins, phenoplasts, polycarbonates, polyolefines, such as polystyrene, polyvinyl chloride, polyethylene, polypropylene, polyacrylonitrile and polyacrylic acid esters, polyamides, polyurethanes or polyesters, rubber, casein, silicone and silicone resins, individually or as mixtures.

It is immaterial whether the high molecular compounds mentioned are in the form of plastic masses or melts or in the form of spinning solutions, lacquers, paints or printing inks. Dependeing on the end use, it proves advantageous to use the new pigments as toners or in the form of preparations.

To obtain finely divided pigments it is frequently advantageous to subject the pigments to a grinding process.

The new pigments are distinguished by outstanding fastness to light and to weathering.

In the examples which follow the parts, unless otherwise stated, denote parts by weight and the percentages denote percentages by weight.

EXAMPLE 1

21.1 parts of 8-cyano-1-naphthoic acid methyl ester in 80 parts of methanol, together with 19.4 parts of a 30% strength sodium methylate solution in methanol, are kept at 50°–55° C for 1½ hours, whilst stirring. When all has dissolved, 15.7 parts of 2-cyanomethyl-benzimidazole are added at room temperature and the mixture is stirred for 16 hours at the same temperature, then warmed to the reflux temperature (64° C) and stirred for a further 3 hours at this temperature. It is now acidified with 25 parts of glacial acetic acid after which stirring is continued for a further 1–2 hours at 60°–65° C. After cooling, the precipitate is filtered off and rinsed with methanol and water. It is an orange-red crystal powder of the formula

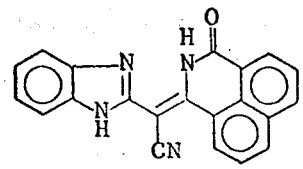

8-Cyano-1-naphthoic acid methyl ester is obtained from naphthalic anhydride via the following reaction steps:
1. Formation of the acid chloride with PCl₅
2. Reaction with aqueous NH₃ to give the ammonium salt of 8-cyanonaphthoic acid and
3. Esterification with dimethyl sulphate.

Melting point of the ester: 111°–112° C.

EXAMPLE 2

To form a complex, 3.36 parts of the product from Example 1 and 1.37 parts of cobalt acetate.4H₂O in 100 parts of diethylene glycol monoethyl ether or dimethylformamide are heated for 15 hours to 145°–150° C, whilst stirring. The precipitate which has separated out is filtered off hot and washed with hot o-dichlorobenzene, cold methanol and water. A red pigment powder is obtained which can be brought to a finely divided state, for example by grinding in isopropanol, with the aid of grinding bodies. When milled into polyvinyl chloride, the pigment gives a red film having good fastness to light. A lacquer pigmented with the pigment shows very good fastness to light and to weathering.

EXAMPLES 3 AND 4

If, in Example 2, the cobalt acetate.4H₂O is replaced by the equivalent amount of nickel acetate or copper acetate. H₂O respectively and in other respects the same procedure is followed, pigments which respectively impart a red or a yellow-brown coloration to a polyvinyl chloride film are obtained.

A lacquer pigmented therewith shows the same shades as in polyvinyl chloride and fastness properties comparable to the corresponding cobalt complex.

EXAMPLES 5–15

If, in Example 1, the 2-cyanomethylbenzimidazole is replaced by an equivalent amount of one of the 2-cyanomethylbenzimidazoles indicated in column I of the table which follows, and in other respects the procedure according to Examples 1–4 is employed, pigments with comparable fastness properties are obtained, which impart the colour indicated in column III to the polyvinyl chloride film and pigmented lacquer film, respectively.

| | I | II | III |
|---|---|---|---|
| 5. | CH₃–[benzimidazole]–CH₂–CN | Co | red |
| 6. | " | Ni | red |
| 7. | " | Zn | orange |
| 8. | CH₃,CH₃–[benzimidazole]–CH₂–CN | Co | red |
| 9. | " | Ni | red |

-continued

| | I | II | III |
|---|---|---|---|
| 10. | " | Cu | brown |
| 11. | Cl-[benzimidazole]-CH₂—CN | Co | orange |
| 12. | " | Ni | scarlet |
| 13. | O₂N-[benzimidazole]-CH₂—CN | Co | reddish-tinged yellow |
| 14. | " | Ni | orange |
| 15. | C₂H₅—O-[benzimidazole]-CH₂—CN | Ni | bluish-tinged red |

EXAMPLE 16

65 parts of stabilised polyvinyl chloride, 35 parts of dioctyl phthalate and 0.2 part of the dyestuff obtained according to Example 2 are stirred together and then milled for 7 minutes at 140° C on a twin-roll calender. A film which is pigmented red and has very good fastness to light is obtained.

EXAMPLE 17

10 g of titanium dioxide and 2 g of the pigment prepared according to Example 2 are ground with 88 g of a mixture of 26.4 g of coconut alkyd resin, 24.0 g of melamine-formaldehyde resin (50% solids content), 8.8 g of ethylene glycol monomethyl ether and 28.8 g of xylene for 48 hours in a ball mill.

If this lacquer is sprayed onto an aluminum foil, predried for 30 minutes at room temperature and then stoved for 30 minutes at 120° C, a red lacquering is obtained which has good depth of colour and is distinguished by very good fastness to light and to weathering.

EXAMPLE 18 (ACRYLIC RESIN STOVING LACQUER)

4 parts of the finely divided pigment according to Example 2 are stirred into 20 parts of solvent of the following composition: 50 parts of Solvesso 150 (a mixture of aromatic hydrocarbons), 15 parts of butyl acetate, 5 parts of Exkin II (a flow control agent based on a ketoxime), 25 parts of methyl isobutyl ketone and 5 parts of silicone oil (1% strength in Solvesso 150).

After fine dispersion of the pigment is complete (in about 15–60 minutes, depending on the nature of the stirrer), the binders are added, namely 48.3 parts of Baycryl L 530 (acrylic resin) (51% strength in xylene/butanol, 3:1) and 23.7 parts of Maprenal TTX (melamine resin) (55% strength in butanol).

After brief homogenisation, the lacquer is applied in accordance with customary methods such as spraying and dipping or, specifically for the continuous coating of metal sheets, by the "coil-coating" process, and is stoved (stoving for 30 minutes at 130° C). The red lacquerings obtained are distinguished by very good levelling, high gloss and excellent fine dispersion of the pigment, and by excellent fastness to weathering.

What we claim is:

1. A metal complex pigment of the formula

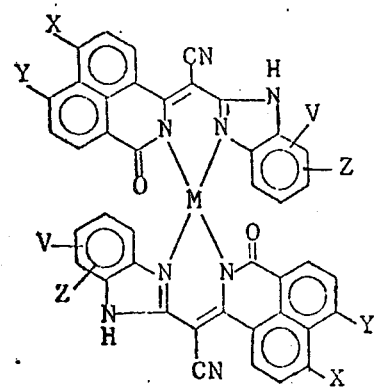

wherein X and Y denote hydrogen; V and Z denote hydrogen, halogen, nitro, alkyl containing 1–6 carbon atoms, alkoxy containing 1–6 carbon atoms, or V and Z can form a fused benzene ring; and M represents zinc, nickel, cobalt or copper.

2. Pigment of the formula

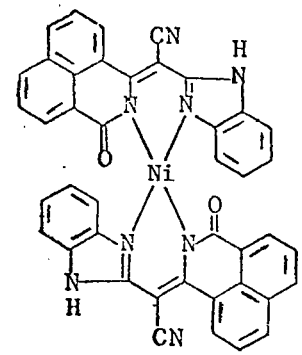

3. Pigment of the formula

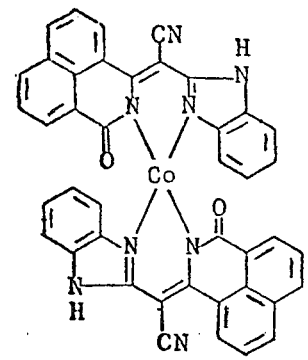

* * * * *